US009672273B2

(12) United States Patent
Kapoor et al.

(10) Patent No.: US 9,672,273 B2
(45) Date of Patent: *Jun. 6, 2017

(54) REPRESENTING A MACHINE-TO-MACHINE DEVICE MODEL BASED ON ONTOLOGICAL RELATIONSHIPS

(71) Applicant: International Business Machines Corporation, Armonk, NY (US)

(72) Inventors: Shalini Kapoor, Bangalore (IN); Amit M. Mangalvedkar, Bangalore (IN); Vishwanath Narayan, Boca Raton, FL (US); Pallavi Nishtala, Mumbai (IN); Sivananthan Perumal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,440

(22) Filed: Oct. 27, 2014

(65) Prior Publication Data
US 2015/0242491 A1 Aug. 27, 2015

Related U.S. Application Data

(63) Continuation of application No. 14/186,836, filed on Feb. 21, 2014.

(51) Int. Cl.
*G06F 17/30* (2006.01)
*H04L 12/24* (2006.01)

(52) U.S. Cl.
CPC .. *G06F 17/30604* (2013.01); *G06F 17/30876* (2013.01); *H04L 41/04* (2013.01); *H04L 41/145* (2013.01); *H04L 41/12* (2013.01)

(58) Field of Classification Search
CPC ..... H04L 41/12; H04L 29/0899; H04L 41/04; H04L 41/145; G06F 3/048; G06F 8/34;
(Continued)

(56) References Cited

U.S. PATENT DOCUMENTS 6,754,593 B1 * 6/2004 Stewart .............. G01N 21/9501
257/E21.525
7,401,057 B2 7/2008 Eder
(Continued)

FOREIGN PATENT DOCUMENTS

CN 101909255 A 12/2010
CN 102907068 A 1/2013
(Continued)

OTHER PUBLICATIONS

Avanes, Artin, "Intelligent Service-to-Device Mapping within a Smart Items Infrastructure", SAP, Berlin, Nov. 22, 2005. <http://www.mi.fu-berlin.de/en/inf/groups/ag-db/jobs_and_theses/finished_thesis/AvanesDipl.pdf>.
Chen et al., "Towards Agile Application Integration with M2M Platforms", KSII Transactions on Internet and Information Systems vol. 6, No. 1, Jan. 2012. <http://dx.doi.org/10.3837/tiis.2012.01.005>.
(Continued)

*Primary Examiner* — David Lazaro
*Assistant Examiner* — Berhanu Shitayewoldetsad
(74) *Attorney, Agent, or Firm* — Maeve Carpenter

(57) ABSTRACT

In an approach for creating a machine-to-machine device model based on ontological relationship, one or more computer processors determine a plurality of characteristics of one or more machine-to-machine devices within a machine-to-machine communication environment. The one or more computer processors determine one or more ontological relationships between the one or more machine-to-machine devices and the plurality of characteristics of the one or more machine-to-machine devices. The one or more computer processors create a semantic device model, based, at least in part, on the one or more ontological relationships between the one or more machine-to-machine devices and the plurality of characteristics of the one or more machine-to-machine devices.

10 Claims, 4 Drawing Sheets

(58) Field of Classification Search
CPC ........ G06F 17/30604; G06F 17/30876; H04W 4/14; H04W 4/18; H04W 4/206; H04W 74/00; H04W 76/026; H04W 84/18; H04W 88/06; H04W 88/16; H04W 88/18; H04W 8/22; H04W 92/02
USPC ........................ 709/223–245; 703/6; 718/100
See application file for complete search history.

(56) References Cited

U.S. PATENT DOCUMENTS

| | | | | |
|---|---|---|---|---|
| 2004/0103140 | A1* | 5/2004 | Huddleston | G06Q 30/0601 709/203 |
| 2009/0319239 | A1* | 12/2009 | Arnold | G06N 5/02 703/6 |
| 2011/0022733 | A1 | 1/2011 | Karaoguz et al. | |
| 2011/0213871 | A1 | 9/2011 | DiGirolamo et al. | |
| 2012/0167094 | A1* | 6/2012 | Suit | G06F 11/3409 718/100 |
| 2013/0227036 | A1 | 8/2013 | Kang et al. | |

FOREIGN PATENT DOCUMENTS

| | | |
|---|---|---|
| WO | 2012109531 A2 | 8/2012 |
| WO | 2013123445 A1 | 8/2013 |

OTHER PUBLICATIONS

Compton et al., "The SSN ontology of the W3C semantic sensor network incubator group", Web Semantics: Science, Services and Agents on the World Wide Web, Jun. 2012. <http://ac.els-cdn.com/S1570826812000571/1-s2.0-S1570826812000571-main.pdf?_tid=ac54bdd4-1504-11e3-94cf-00000aacb35d&acdnat=1378259736_f2c8cd92a53ee06893484e9788ea665f>.

Dibowski et al., "Ontology-Based Device Descriptions and Device Repository for Building Automation Devices", EURASIP Journal on Embedded Systems, Oct. 4, 2010. <http://jes.eurasipjournals.com/content/2011/1/623461>.

Dibowski et al., "Ontology-Based Device Descriptions and Triple Store Based Device Repository for Automation Devices", IEEE Xplore Digital Library, 2010. <http://ieeexplore.ieee.org/xpl/login.jsp?tp=&arnumber=5641257&url=http%3A%2F%2Fieeexplore.ieee.org%2Fxpls%2Fabs_all.jsp%3Farnumber%3D5641257>.

Kitamura et al., "An ontological model of device function: industrial deployment and lessons learned", Applied Ontology, vol. 1, No. 3-4, pp. 237-262, 2006. <http://citeseerx.ist.psu.edu/viewdoc/download?doi=10.1.1.76.1145&rep=rep1&type=pdf>.

Sun et al., "A General M2M Device Model", IEEE Xplore Digital Library, 2010. <http://ieeexplore.ieee.org/stamp/stamp.jsp?tp=&arnumber=5607384&tag=1>.

U.S. Appl. No. 14/186,836, filed Feb. 21, 2014.

* cited by examiner

REPRESENTING A MACHINE-TO-MACHINE DEVICE MODEL BASED ON ONTOLOGICAL RELATIONSHIPS

FIELD OF THE INVENTION

The present invention relates generally to the field of computer network management, and more particularly to creating and representing a machine-to-machine device model based on ontological relationships.

BACKGROUND OF THE INVENTION

Machine-to-machine ("M2M") technology includes a form of data communication that involves one or more entities, or devices, that do not necessarily require human interaction or intervention in the process of communication. The M2M communication may enable different types of services that are valuable to an end user. For example, M2M communication services may include smart metering, healthcare monitoring (e.g., patient monitoring), remote security sensing, smart grid, weather monitoring, etc. M2M architecture may include a variety of elements such as M2M devices (e.g., a sensor, an actuator), M2M area network, M2M communication network, and/or an M2M application service server. Typically, M2M applications may be configured or developed based on M2M platforms, which may be used to provide a variety of M2M application services based on the collected device data.

SUMMARY

Embodiments of the present invention are directed to a method, computer program product, and computer system for creating a machine-to-machine device model based on ontological relationship. The method includes one or more computer processors determining a plurality of characteristics of one or more machine-to-machine devices within a machine-to-machine communication environment. The one or more computer processors determine one or more ontological relationships between the one or more machine-to-machine devices and the plurality of characteristics of the one or more machine-to-machine devices. The one or more computer processors create a semantic device model, based, at least in part, on the one or more ontological relationships between the one or more machine-to-machine devices and the plurality of characteristics of the one or more machine-to-machine devices.

DETAILED DESCRIPTION

Figure 1:
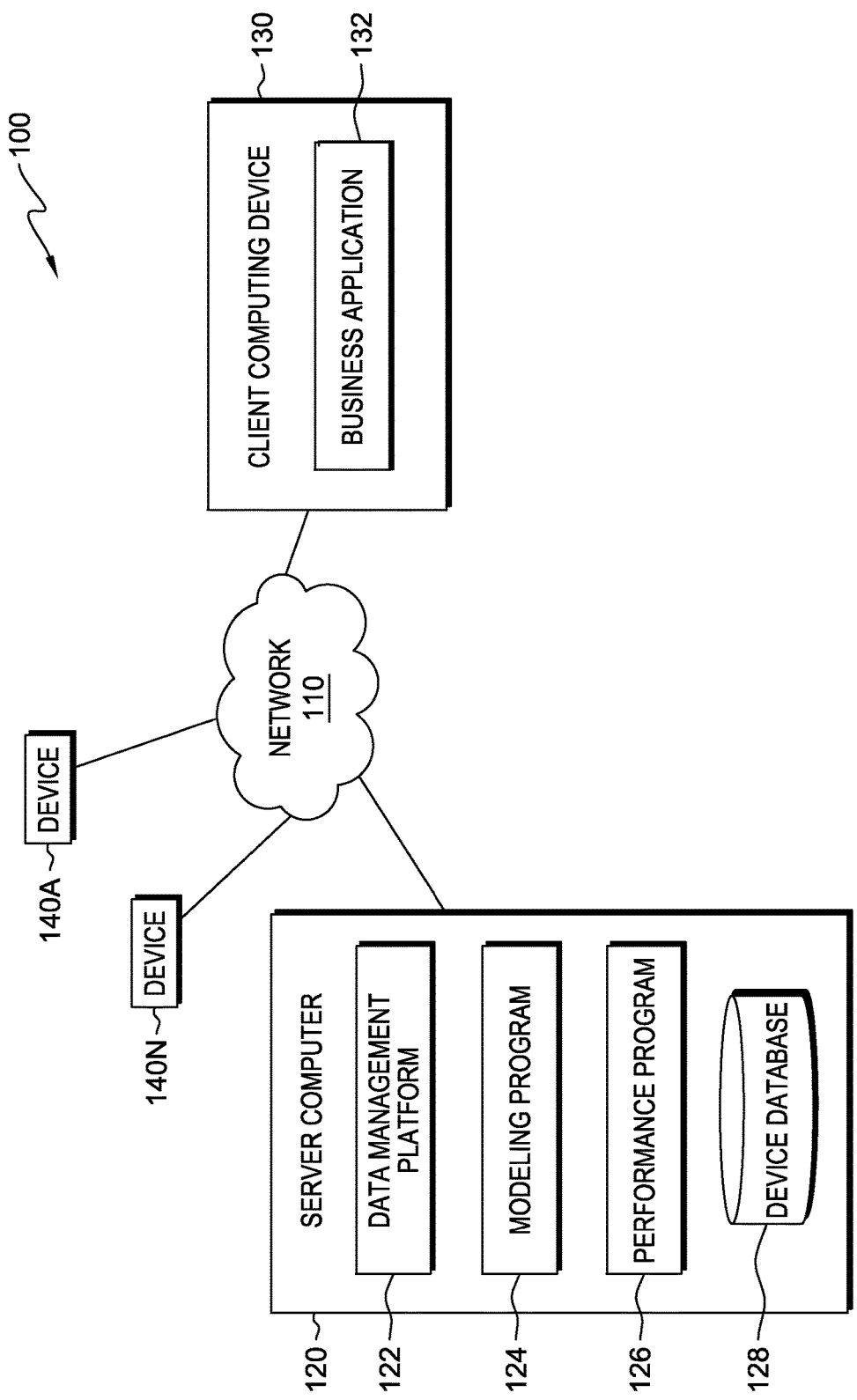
FIG. 1 is a functional block diagram illustrating a distributed M2M communication environment, in accordance with an embodiment of the present invention.

The present invention will now be described in detail with reference to the Figures. FIG. 1 is a functional block diagram illustrating a distributed M2M communication environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed M2M communication environment 100 includes server computer 120, client computing device 130, and devices 140A to 140N, all interconnected over network 110. Network 110 may be a local area network (LAN), a wide area network (WAN), such as the Internet, any combination of the two, or any combination of connections and protocols that will support communication between server computer 120, client computing device 130, and devices 140A to 140N, in accordance with embodiments of the present invention. Network 110 may include wired, wireless, or fiber optic connections.

Server computer 120 may be a laptop computer, a tablet computer, a netbook computer, a personal computer (PC), a personal digital assistant (PDA), a smart phone, or any programmable electronic device capable of communicating with client computing device 130 and devices 140A to 140N. Server computer 120 may be a management server, a web server, or may represent a computing system utilizing clustered computers and components to act as a single pool of seamless resources when accessed through a network. Server computer 120 may include internal and external components, as depicted and described in further detail with respect to FIG. 4.

Server computer 120 includes data management platform 122, modeling program 124, performance program 126, and device database 128. Data management platform 122 is a computing platform, or computing system, capable of receiving, integrating, and managing data and information from a variety of sources, for example, devices 140A to 140N. Data management platform 122 processes incoming device data, including administration and management functions, and communicates the information to modeling program 124 and performance program 126, and to client computing device 130 via network 110.

Modeling program 124 determines device characteristics of devices within distributed M2M communication environment 100, such as devices 140A to 140N, and creates semantic models for the devices 140A to 140N representing ontological relationships between device characteristics and various components and elements, or generally, how device characteristics, components, and elements are related to each other within distributed M2M communication environment 100. For example, modeling program 124 can determine ontological relationships between various device characteristics and metrological entities, hardware components, software components, business attributes, device attributes, protocols (including transport level protocols), performance parameters, connectivity mediums, or any other component, characteristic, or element of a device. Metrological entities in a M2M environment ensure that regardless of how a physical quantity is measured, received, or represented, it is interpreted correctly. Metrological entities include, for example, standards used in the M2M industry and any relationships between various standards, systems of measure, units of measure, and physical quantity information such as base units (fundamental units), derived units, or hybrid units, such as blood sugar or blood pressure quantities which are more commonly referred to using unique units. Business attributes can be, for example, measureable attributes for which the device exists, including what the device is meant to measure, what boundary conditions are for the device's measurements, and what unit of measurement the device uses. Device attributes can be, for example, attributes that describe quantifiable parameters needed to describe the device itself, including descriptive attributes providing metadata about how a device is different from other existing device types.

Modeling program 124 represents the ontological relationships and device characteristics in a semantic device model, which can aid in determining capabilities of a device and protocols supported by a device. A semantic device model describes relationships between various data elements, for example, device characteristics, and real world information, and interrelationships of the data elements with other data elements. The relationships can be, generally, a description of the relationship among components within distributed M2M communication environment 100 and each of devices 140A to 140N. For example, ontological relationships among and between metrological entities ensure that a term or measurement is properly interpreted, for example, the physical quantity "pressure" could be stored in pounds per square inch (psi), Pascals, or dynes per square centimeters, and an ontological relationship represented in a semantic device model can aid in interpreting the received pressure measurement. While shown in FIG. 1 as individual programs, one of skill in the art will recognize that modeling program 124 and performance program 126 can be implemented as one program. Additionally, while modeling program 124 and performance program 126 are shown in FIG. 1 on server computer 120, one of skill in the art will recognize each program can function elsewhere in distributed M2M communication environment 100 with access to device 140A to 140N and device database 128 via network 110.

Performance program 126 determines, using the device model created by modeling program 124, configurations of devices and performance parameters that can be set within distributed M2M communication environment 100 for various business applications, such as business application 132. Device database 128 contains device types, individual device component information, created device models, and ontological relationship information among device components.

Client computing device 130 may be a laptop computer, a tablet computer, a netbook computer, a PC, a PDA, a smart phone, or any programmable electronic device capable of communicating with server computer 120 and devices 140A to 140N via network 110. Client computing device 130 includes business application 132. Business application 132 can be a computer software application, system software, programming tool, or any application running on client computing device 130 that can translate information gathered from devices 140A to 140N into meaningful information for use with a business process. Business application 132 can be, for example, a safety program, a maintenance program, a sales program, a facility management program, or any other software application or program that uses the information obtained and gathered from devices 140A to 140N.

Devices 140A to 140N can be electronic devices, for example, a sensor, including a heat sensor, a humidity sensor, or a light sensor, an actuator, a radio-frequency identification ("RFID") tag reader, a camera, or a meter, which captures an event, such as a temperature reading or inventory information. Devices 140A to 140N can communicate data through a network, either wired or wireless, for example, network 110.

Figure 2:
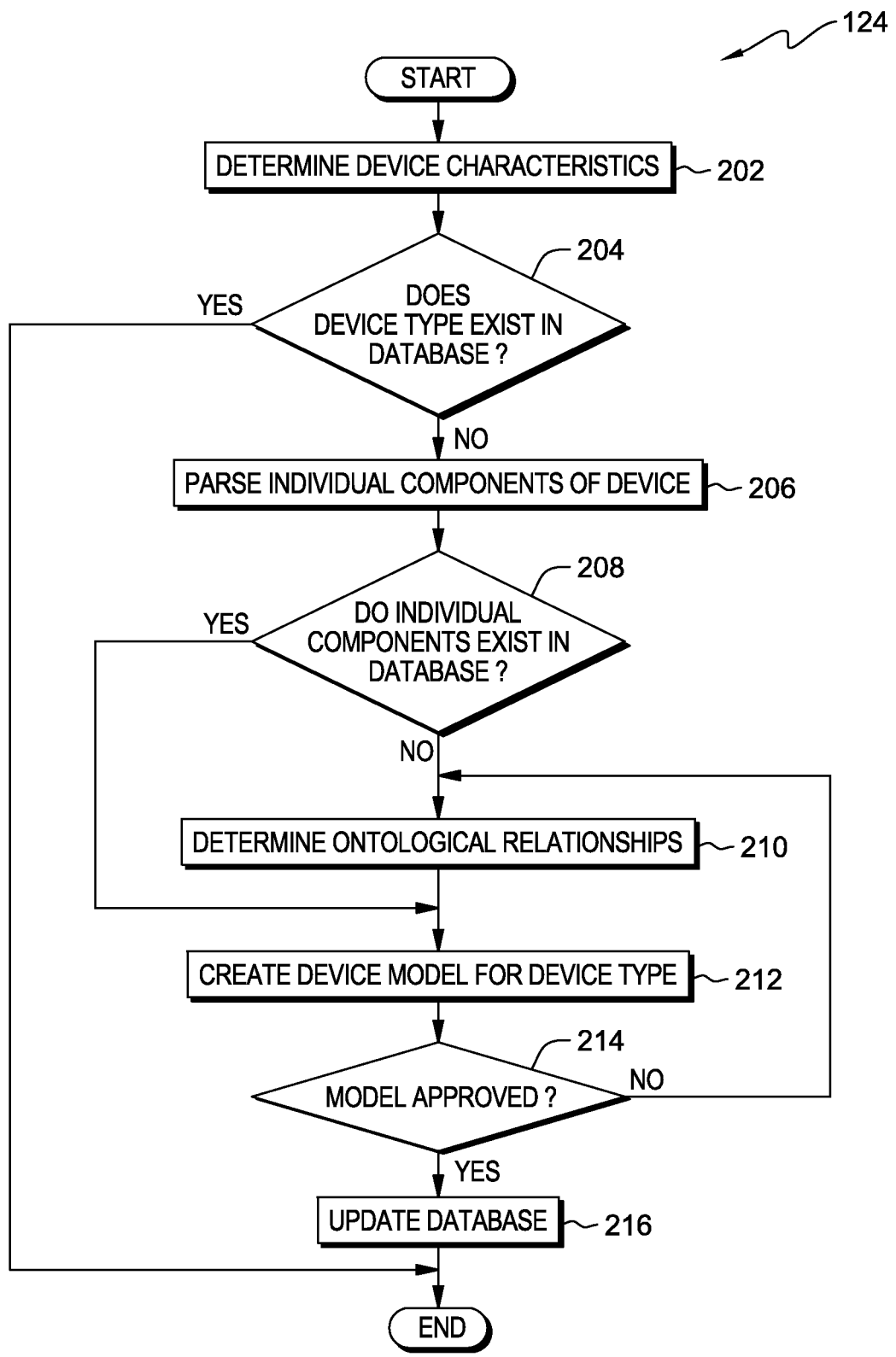
FIG. 2 is a flowchart depicting operational steps of a modeling program, for determining and representing ontological relationships between device characteristics in the distributed M2M communication environment of FIG. 1, in accordance with an embodiment of the present invention.

FIG. 2 is a flowchart depicting operational steps of modeling program 124, for determining and representing ontological relationships between device characteristics in distributed M2M communication environment 100, in accordance with an embodiment of the present invention.

Modeling program 124 determines device characteristics (step 202). Device characteristics include, for example, protocol supports, performance parameters, hardware components, software components, connectivity mediums, metrological entities, and other capabilities and characteristics of the device, for example, each of device 140A to 140N in distributed M2M communication environment 100.

Modeling program 124 determines whether the device exists in device database 128 (decision block 204). Modeling program 124 checks for a device having the determined device characteristics, and if the device type already exists in device database 128 (decision block 204, "yes" branch), no further processing occurs. If the device does not exist in device database 128 (decision block 204, "no" branch), modeling program 124 parses individual components of the device (step 206). In an embodiment of the present invention, modeling program 124 can also check a standards organization for ontological relationship information for characteristics of the device, for example, when determining metrological entity relationships or protocol relationships.

Modeling program 124 parses individual components of the device, for example, hardware and software components, protocols, metrological entities, performance parameters, connectivity mediums, and device type classification information. Modeling program 124 determines if the individual parsed components of the device exist in device database 128 (decision block 208). If the individual parsed components do exist in device database 128 (decision block 208, "yes" branch), modeling program 124 creates a device model for the device type using the stored relationship information in device database 128. If the individual parsed components do not exist in device database 128 (decision block 208, "no" branch), modeling program 124 determines ontological relationships between the individual components of the device (step 210). In an embodiment of the present invention, modeling program 124 determines ontological relationships and component characteristics for each component individually, for example, relationships involving hardware components, and then relationships involving protocols.

Modeling program 124 generates and creates a semantic device model for the device type using the ontological relationships between the individual parsed components (step 212). The created device model represents ontological relationships between the individual components of the device. In an embodiment, the semantic device model uses Web Ontology Language (OWL) or Resource Description Framework (RDF) as a general method of conceptual description and modeling. The created device model represents capabilities of the device, for example, communication protocols supported and configurations of the device that can be read or set. The created device model can aid in configuration and backup of devices and can allow for intelligent queries against the device model. Queries against a device model may include, for example, whether a device type is capable of supporting high-level communication protocols used to create personal area networks built from small, low-power digital radios, or whether a 'device A', belonging generally to 'device type a', can be used in place of 'device B', belonging generally to 'device type b'.

Additionally, maintaining ontological relationships between a device and various device characteristics can remove ambiguity arising from device readings. For example, if there are three thermal sensors in distributed M2M communication environment 100, each reporting measurements in different units, data received from each device may be difficult to interpret. However, if an ontological relationship between a thermal sensor measuring liquid nitrogen in Kelvin and the metrological entity receiving the quantity measurement is known, the data returned from the thermal sensor may be properly interpreted.

Modeling program 124 determines whether the created model is approved (decision block 214). In an embodiment, the created device model is sent to a device modeler or administrator for approval. In various embodiments, the device modeler or administrator can add rules and relationships for certain device characteristics, for example, relationships for and between hardware components and software components. If the created device model is not approved (decision block 214, "no" branch), the device model is rejected and removed. If the created model is approved (decision block 214, "yes" branch), modeling program 124 updates device database 128 with the created model and stores the ontological relationship information (step 216).

Figure 3:
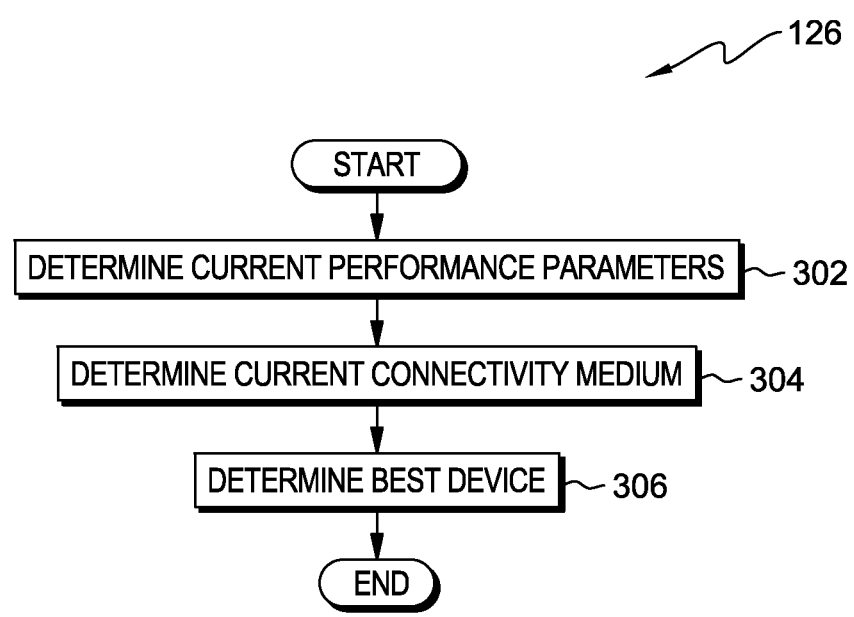
FIG. 3 is a flowchart depicting operational steps of a performance program, for determining a device given conditions and parameters of use, using the model created by the modeling program of FIG. 2, in accordance with an embodiment of the present invention.

FIG. 3 is a flowchart depicting operational steps of a performance program, for determining a device given conditions and parameters of use, using the model created by the modeling program of FIG. 2, in accordance with an embodiment of the present invention.

Performance program 126 determines current performance parameters (step 302). For optimum performance in connection with business application 132, performance program 126 determines, for example, bandwidth needed, storage required, data accessibility, and other performance parameters of the device represented by the created device model. In an embodiment, optimum performance parameters for current conditions may be determined by accessing device vendors and standards databases. In various embodiments of the present invention, performance program 126 can rank the determined performance parameters in order of most important for the device to operate to least important for the device, or vice versa.

Performance program 126 determines current connectivity mediums (step 304). Based on given parameters and current conditions such as business application 132, device location, cost of network, user reviews, and service provider performance, performance program 126 determines which device model is best for available connection mediums. In an embodiment, performance program 126 can create a model for connectivity mediums which shows the relationship between the device model and the connectivity mediums, for example, WiFi, wired, 3G, LTE, and others, and provides information on which is best for the device to connect to at what time and what location.

Performance program 126 determines a device for the current performance parameters and current connectivity mediums using the created device model and the current condition information (step 306). The current parameters and condition information may be, for example, retrieved from business application 132 or inputted by a user within distributed M2M communication environment 100. Based on the current parameters and condition information, a "best" device, or a device suited for optimum performance, as compared with other available devices, may be determined.

Figure 4:
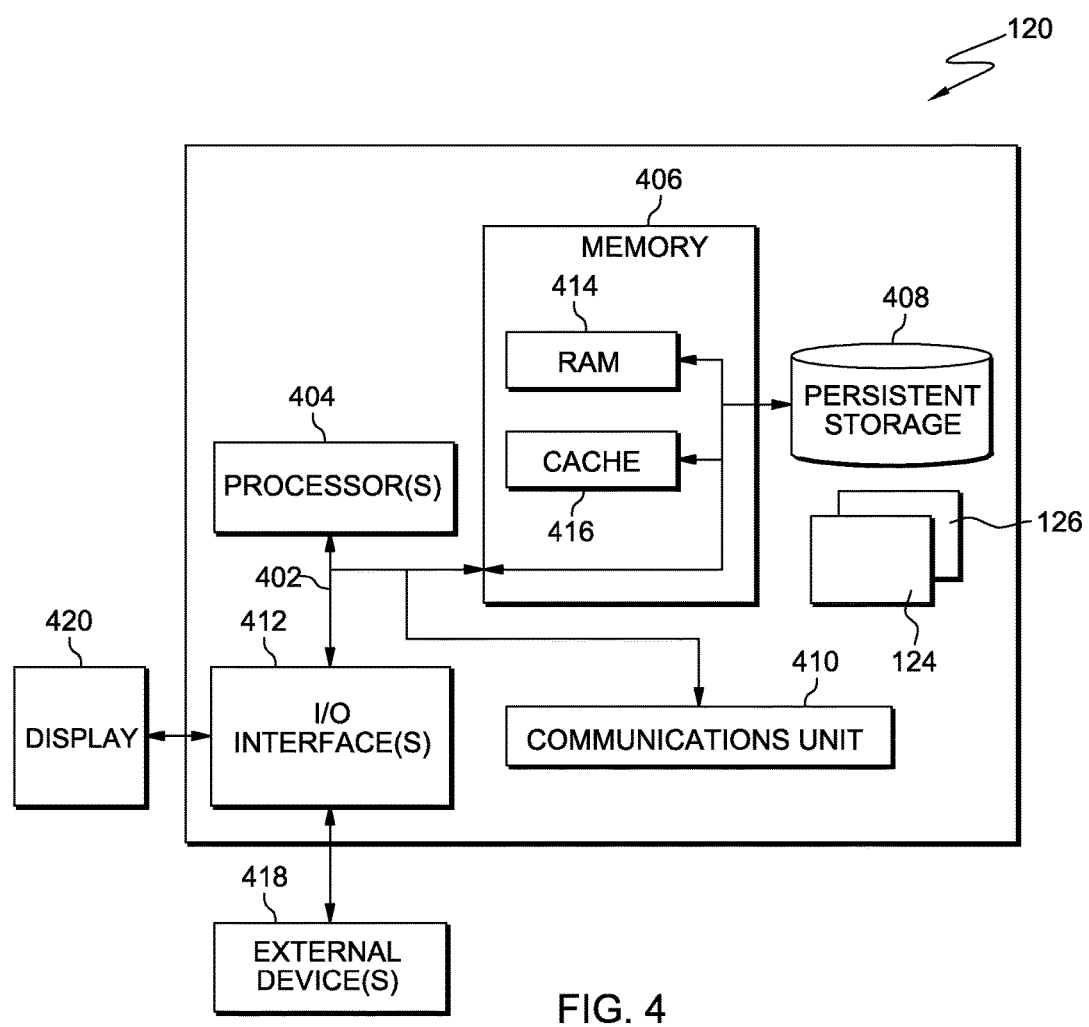
FIG. 4 depicts a block diagram of components of a server computer, such as the server computer of FIG. 1 executing the modeling program and the performance program, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Modeling program 124 and performance program 126 can be stored in persistent storage 408 for execution and/or access by one or more of the respective computer processors 404 via one or more memories of memory 406, as depicted in FIG. 4. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including client computing device 130 and devices 140A to 140N. In these examples, communications unit 410 includes one or more network interface cards. Communications unit 410 may provide communications through the use of either or both physical and wireless communications links. Modeling program 124 and performance program 126, shown in FIG. 4, may be downloaded to persistent storage 408 through communications unit 410.

I/O interface(s) 412 allows for input and output of data with other devices that may be connected to server computer 120. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., data management platform 122, modeling program 124, performance program 126, and device database 128, can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for creating a machine-to-machine device model based on ontological relationships, the method comprising:
   determining, by one or more computer processors, a plurality of characteristics of one or more machine-to-machine devices within a machine-to-machine communication environment;
   determining, based on the plurality of characteristics, whether at least one device of the one or more machine-to-machine devices exists in a database;
   responsive to determining the at least one device of the one or more machine-to-machine devices does not exist in the database, parsing a plurality of individual components of the at least one device;
   determining, by the one or more computer processors, one or more ontological relationships between the at least one device of the one or more machine-to-machine devices and the plurality of characteristics of the one or more machine-to-machine devices, wherein determining the one or more ontological relationship includes determining, by the one or more computer processors, at least one ontological relationship between the at least one device and one or more metrological entities;
   receiving, by the one or more computer processors, a physical quantity measurement using a first metrological entity standard from a first machine-to-machine device in the machine-to-machine communication environment;
   receiving, by the one or more computer processors, a physical quantity measurement using a second metrological entity standard from a second machine-to-machine device in the machine-to-machine communication environment;
   interpreting, by the one or more computer processors, based, at least in part on the determined ontological relationship between the first machine-to-machine device and a metrological entity and the determined ontological relationship between the second machine-to-machine device and a metrological entity, the physical quantity measurement received from each of the first and the second machine-to-machine devices using, respectively, each of the first metrological entity standard and the second metrological entity standard; and
   creating, by the one or more computer processors, a semantic device model, based, at least in part, on the one or more ontological relationships between the at least one device of the one or more machine-to-machine devices and the plurality of characteristics of the one or more machine-to-machine devices.

2. The method of claim 1, wherein determining, by the one or more computer processors, one or more ontological relationships between the at least one device of the one or more machine-to-machine devices and the plurality of characteristics of the one or more machine-to-machine devices further comprises:
   determining, by the one or more computer processors, at least one ontological relationship between the at least one device and one or more performance parameters.

3. The method of claim 1, further comprising:
   receiving, by the one or more computer processors, a physical quantity measurement from the at least one device in the machine-to-machine communication environment; and
   interpreting, by the one or more computer processors, based, at least in part on the determined ontological relationship between the at least one device and a metrological entity, the physical quantity measurement.

4. The method of claim 1, wherein determining, by the one or more computer processors, one or more ontological relationships between the at least one device of the one or more machine-to-machine devices and the plurality of characteristics of the one or more machine-to-machine devices further comprises:
   determining, by the one or more computer processors, at least one ontological relationship between the at least one device and one or more business attributes.

5. The method of claim 1, wherein determining, by the one or more computer processors, one or more ontological relationships between the at least one device of the one or more machine-to-machine devices and the plurality of characteristics of the one or more machine-to-machine devices further comprises:
   determining, by the one or more computer processors, at least one ontological relationship between the at least one device and one or more hardware components.

6. The method of claim 1, wherein determining, by the one or more computer processors, one or more ontological relationships between the at least one device of the one or more machine-to-machine devices and the plurality of characteristics of the one or more machine-to-machine devices further comprises:
   determining, by the one or more computer processors, at least one ontological relationship between the at least one device and one or more software components.

7. The method of claim 1, wherein determining, by the one or more computer processors, one or more ontological relationships between the at least one device of the one or more machine-to-machine devices and the plurality of characteristics of the one or more machine-to-machine devices further comprises:
   determining, by the one or more computer processors, at least one ontological relationship between the at least one device and one or more communication protocols.

8. The method of claim 1, wherein determining, by the one or more computer processors, one or more ontological relationships between the at least one device of the one or more machine-to-machine devices and the plurality of characteristics of the one or more machine-to-machine devices further comprises:
   determining, by the one or more computer processors, at least one ontological relationship between the at least one device and one or more connectivity mediums.

9. The method of claim 1, wherein determining, by the one or more computer processors, one or more ontological relationships between the at least one device of the one or more machine-to-machine devices and the plurality of characteristics of the one or more machine-to-machine devices further comprises:

determining, by the one or more computer processors, at least one ontological relationship between the at least one device and one or more device attributes.

10. The method of claim 1, wherein the plurality of individual components of the at least one device include at least one of: a hardware component, a software component, a protocol, a metrological entity, a performance parameter, and a connectivity medium.

* * * * *